(12) United States Patent
Honda et al.

(10) Patent No.: US 6,195,249 B1
(45) Date of Patent: Feb. 27, 2001

(54) ELECTRONIC COMPONENT HAVING GAPS BETWEEN CONDUCTIVE THIN FILMS

(75) Inventors: Kazuyoshi Honda, Takatsuki; Noriyasu Echigo, Kobe; Masaru Odagiri, Kawanishi; Nobuki Sunagare, Matsue, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/341,737
(22) PCT Filed: Mar. 12, 1998
(86) PCT No.: PCT/JP98/01077
 § 371 Date: Jul. 15, 1999
 § 102(e) Date: Jul. 15, 1999
(87) PCT Pub. No.: WO98/41999
 PCT Pub. Date: Sep. 24, 1998

(30) Foreign Application Priority Data

Mar. 17, 1997 (JP) .................................................. 9-062652

(51) Int. Cl.[7] ............................. H01G 4/228; H01G 4/06
(52) U.S. Cl. .................... 361/306.3; 361/313; 361/321.2
(58) Field of Search ................................ 361/301.4, 303, 361/306.3, 312–313, 321.1–321.5, 329; 29/25.41, 25.42; 338/22 R

(56) References Cited

U.S. PATENT DOCUMENTS

| 4,471,406 | * | 9/1984 | Sawairi | 361/328 |
| 5,032,461 | | 7/1991 | Shaw et al. | 428/461 |
| 5,043,843 | | 8/1991 | Kimura et al. | 361/308.1 |

FOREIGN PATENT DOCUMENTS 61-183913  8/1986 (JP) .

* cited by examiner

Primary Examiner—Anthony Dinkins
(74) Attorney, Agent, or Firm—Merchant & Gould P.C.

(57) ABSTRACT

An electronic component provided with a dielectric thin film (4), normal electrodes (1a, 1b) formed on the thin film (4), dummy electrodes (2a,2b) formed on the dielectric thin film (4) with an insulating region (20) therebetween, and auxiliary electrodes (3) provided on both side faces of the component, wherein the width of the insulating region (20) is not less than 500 times the thickness of the dielectric thin film (4) so as to improve the characteristics such as the equivalent series resistance. Thus, the deterioration of the frequency characteristics caused by the dummy electrodes can be remedied and the component can be used for a capacitor or the like.

8 Claims, 6 Drawing Sheets

ELECTRONIC COMPONENT HAVING GAPS BETWEEN CONDUCTIVE THIN FILMS

TECHNICAL FIELD

The present invention relates to an electronic component. More particularly, the present invention relates to an electronic component typified by a capacitor comprising conductive thin films and dielectric thin films that are laminated alternately.

BACKGROUND ART

Thin films play an important part in a wide range in the current society and are utilized in a variety of areas in our daily life such as wrapping papers, magnetic tapes, capacitors, semiconductors or the like. The basic trends of technology including high performance and miniaturization in recent years cannot be discussed without referring to such thin films. At the same time, various methods for forming a thin film have been under development to satisfy industrial demands. For example, continuous winding vacuum evaporation, which is advantageous to highspeed mass production, has been performed to form the thin films for use in wrapping papers, magnetic tapes, capacitors or the like.

In this case, a thin film having desired characteristics can be formed by selecting an evaporation material and a substrate material to meet the purpose of the thin film to be formed and introducing a reactive gas in a vacuum chamber, if necessary, or forming the thin film while applying an electric potential to the substrate.

For example, in the production of a magnetic recording medium, a long magnetic recording medium can be obtained by performing reactive evaporation with an evaporation material containing a magnetic element such as Co, Ni, Fe or the like while introducing an oxygen gas into the vacuum chamber.

Furthermore, for semiconductors, thin films are formed primarily by sputtering. Sputtering is particularly effective in forming thin films with a ceramic based material. A ceramic thin film having a thickness of several $\mu$m or more is formed by coating and firing, and a ceramic thin film having a thickness 1 $\mu$m or less often is formed by sputtering.

On the other hand, when a resin material is used to form a thin film, a coating method is used. Reverse coating or die coating is used industrially and generally a material diluted with a solvent is applied, dried and cured. Furthermore, the lower limit of the thickness of the resin thin film formed by these methods is often around 1 $\mu$m, although it may be varied depending on the material used. It is often difficult to obtain a thickness 1 $\mu$m or less. The thickness of coating by a common coating technique is several $\mu$m or more immediately after coating. Therefore, the material is required to be diluted with a solvent to form a very thin resin film, and a resin thin film having a thickness of 1 $\mu$m or less often cannot be obtained.

Furthermore, the solvent dilution is not preferable, because the dilution with a solvent causes defects readily in a coating film after drying, as well as in view of environmental protection. Therefore, a method for forming a resin thin film without the solvent dilution and a method by which a very thin resin film can be obtained stably are in demand.

As a method to solve this problem, a method for forming a resin thin film in a vacuum has been proposed (e.g., U.S. Pat. No. 5,032,461). In this method, a resin material is atomized in a vacuum and then allowed to adhere to a support. This method permits a resin thin film to be formed without void defects and eliminates the solvent dilution.

The lamination of different thin films on a ceramic thin film or a resin thin film has achieved various complex thin films that had not been realized before and is used in various industrial fields. Above all, in the field of a chip-form electronic component, which is particularly promising, the method of laminating thin films is achieving significantly compact and high-performance capacitors, coils, resistors, capacitive batteries, or complex components thereof, and the commercialization and the market expansion of these components have started already.

In the electronic component formed of thin films, in addition to the basic performance, the connection to the electrode is important. Especially, when a conductive portion is made of a thin film, for example, in a chip component where a ceramic thin film or a resin thin film and a metal thin film are laminated, an auxiliary electrode for soldering may be provided at ends of the thin films to ensure sufficient electrode strength for mounting.

In this case, for adhesive strength between the auxiliary electrode and the metal thin film, it is effective to form a dummy electrode in contact with the auxiliary electrode. For example, when a dielectric thin film made of a ceramic thin film or a resin thin film and a conductive thin film are laminated, the following structure is preferable. As shown in the schematic view of FIG. 6, a dielectric thin film 4 is formed on a first conductive thin film 1a, and a second conductive thin film 1b is formed on the dielectric thin film 4. Furthermore, a third conductive thin film 2a having approximately the same electric potential as that of the second conductive thin film 1b is formed as a dummy electrode approximately in the same surface on which the first conductive thin film 1a is formed with an insulating region 20 therebetween, and a fourth conductive thin film 2b having approximately the same electric potential as that of the first conductive thin film 1a is formed as a dummy electrode approximately in the same surface on which the second conductive thin film 1b is formed with the insulating region 20 therebetween.

Thereafter, when auxiliary electrodes 3 are formed at the ends of the thin films, the auxiliary electrodes are attached not only to the first and second conductive thin films 1a and 1b as the fundamental and normal electrodes, but also to the third and fourth conducive thin films 2a and 2b which are the dummy electrodes, so that the adhesive strength of the auxiliary electrodes 3 can be improved. The smaller dummy electrode portions 2a and 2b are more preferable in view of the miniaturization of the chip component.

However, when the dummy electrodes are used as described above, although the adhesive strength is improved, a problem may arise in the characteristics.

More specifically, it is found that the characteristics of the electronic component are degraded because the dummy electrodes function as electrodes, resulting in a detriment to the achievement of high performance. For example, when a capacitor including the dummy electrodes as shown in section in FIG. 6 is formed, the steepness at the drop point (dip point) in the frequency characteristics of the impedance may become slightly less prominent, and the impedance at the dip point in this case increases by 10 to 15%.

The impedance at the dip point is important for noise removal or filter formation by using a capacitor. Therefore, both of the adhesive strength of the auxiliary electrode and the high performance have been required to be achieved. Furthermore, a similar problem arises in formation of a chip coil having the dummy electrode.

DISCLOSURE OF THE INVENTION

The present invention has an object of providing an electronic component including a dummy electrode that has a small equivalent series resistance at the drop point (dip point) in the frequency characteristics of the impedance.

In order to achieve the above-described object, an electronic component of the present invention includes a first conductive thin film, a dielectric thin film formed on the first conductive thin film, and a second conductive thin film formed on the dielectric thin film. A third conductive thin film having an electric potential approximately equal to that of the second conductive thin film is formed approximately in the same surface on which the first conductive thin film is formed with an insulating region therebetween, and a fourth conductive thin film having an electric potential approximately equal to that of the first conductive thin film is formed approximately in the same surface on which the second conductive thin film is formed with the insulating region therebetween. A gap between the first conductive thin film and the third conductive thin film and a gap between the second conductive thin film and the fourth conductive thin film are not less than 500 times the thickness of the dielectric thin film. This embodiment of the present invention can provide a laminated thin film having a small equivalent series resistance and thus can provide a high performance electronic component such as a high performance capacitor.

In the embodiment above, the dielectric thin film can be formed of a resin thin film. The resin thin film is excellent in the insulating property and the dielectric characteristics. Furthermore, a very thin resin film can be formed easily by vaporizing or atomizing a resin material to be attached onto a support. Therefore, for example, when the electronic component is a capacitor, a compact capacitor with large capacity can be obtained.

In the embodiment above, preferably, the resin thin film comprises at least acrylate as a main component. Such a resin material is excellent in the electric characteristics such as the insulating property, the dielectric characteristics or the like, and makes it possible to form a thin film without void defects relatively easily.

In the embodiment above, preferably, the conductive thin film is formed of a metal thin film. This is because it has excellent electric characteristics and makes it possible to form a thin film relatively easily.

In the embodiment above, preferably, the electronic component has an alternate and repeated laminated structure including at least two layers of the conductive thin films and at least two layers of the dielectric thin films. The conductive thin films and the dielectric thin films are laminated alternately. The lamination of multilayers can improve the degree of integration as an electronic component and can achieve a compact and high performance electronic component. For example, in producing a capacitor as the electronic component, the lamination of multilayers increases the capacity of the capacitor. Moreover, according to the present invention, even if the capacitor is made smaller, the equivalent series resistance at the dip point can be small. Thus, a compact capacitor with large capacity and excellent frequency characteristic can be obtained.

In the embodiment above, preferably, the first conductive thin film and the fourth conductive thin film are connected by an auxiliary electrode, and the second conductive thin film and the third conductive thin film are connected by an auxiliary electrode. The conductive thin film contributes more to the bond strength of the auxiliary electrodes than the dielectric thin film does. Therefore, as the auxiliary electrode is attached to the conductive thin film at more portions, the bond strength of the auxiliary electrode is higher. The fourth conductive thin film and the third conductive thin film having the same electric potentials as the first conductive thin film and the second conductive thin film, respectively, are provided as dummy electrodes, and the dummy electrodes are connected to the auxiliary electrodes, so that the bond strength of the auxiliary electrodes is improved significantly. Moreover, the present invention makes it possible to minimize the adverse effect of the dummy electrodes connected to the auxiliary electrodes on the electric characteristics.

In the embodiment above, preferably, a part of or the entire laminate of the conductive thin films and the dielectric thin films functions as a capacitor. The electronic component of the present invention is excellent in the frequency characteristics, although it includes the dummy electrodes. In addition, a compact capacitor with large capacity can be obtained by thinning the dielectric thin films and laminating a large number of films. In other words, if the laminate of the present invention is allowed to function as a capacitor, the advantage of the present invention can be expressed considerably so that the characteristics of the capacitor can be improved significantly.

In the embodiment above, when the gap between the insulating regions in a film surface direction is not more than 17500 times the thickness of the dielectric thin film, the presence of the dummy electrodes (the third conductive thin film and the fourth conductive thin film) with respect to the normal electrodes (the first conductive thin film and the second conductive thin film) cannot be ignored. In this case, the advantage of the present invention is more significant. Herein, referring to FIG. 6, the gap between the insulating regions in the film surface direction refers to the gap between the insulating region between the first conductive thin film 1a and the third conductive thin film 2a and the insulating region between the second conductive thin film 1b and the fourth conductive thin film 2b, when viewed from the film surface direction (laminated layer direction) (i.e., viewed from the upper portion on the sheet of FIG. 6).

BEST MODE FOR CARRYING OUT THE INVENTION

Hereinafter, the present invention will be described by way of examples with reference to the accompanying drawings.

Figure 5:
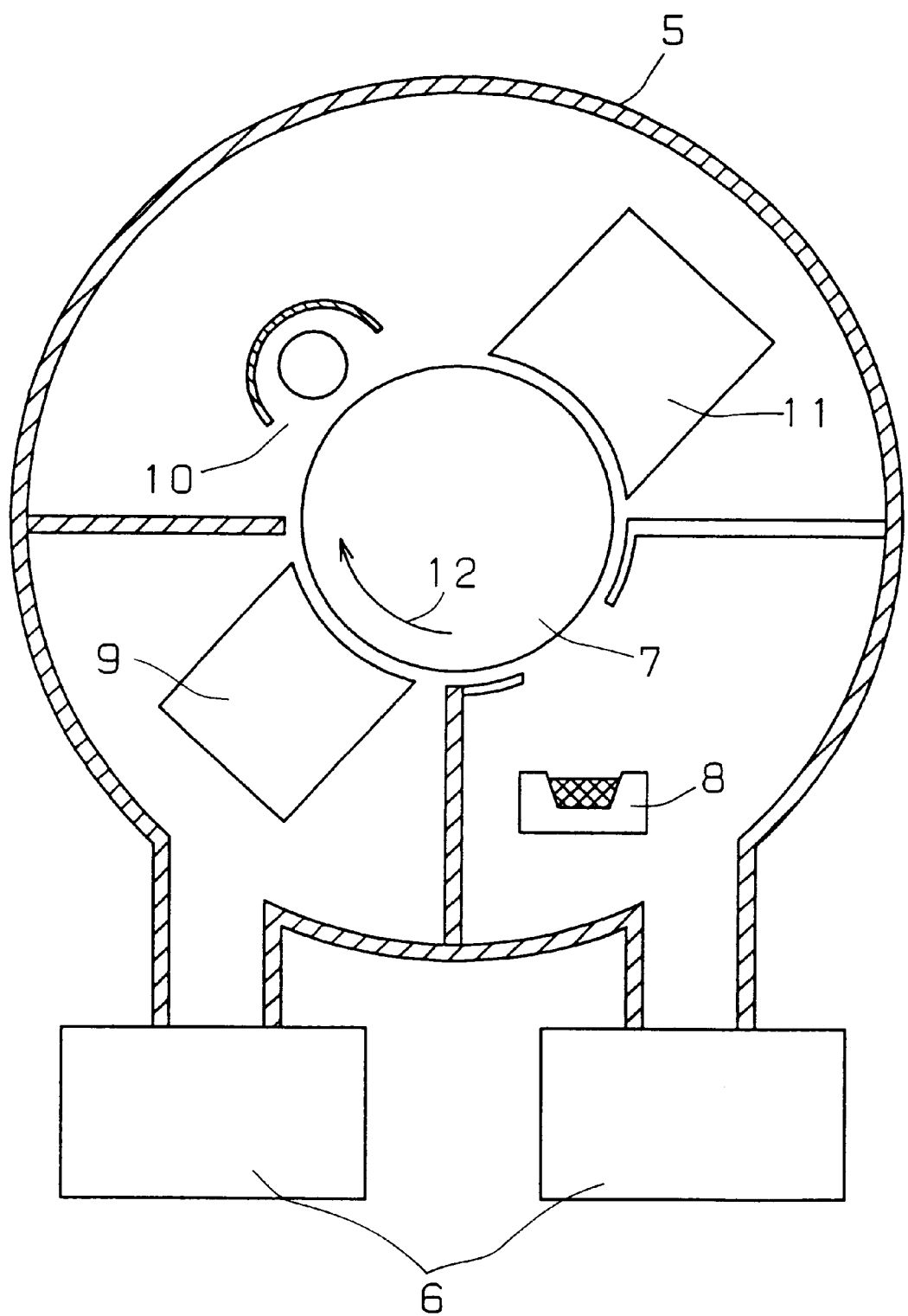
FIG. 5 is a schematic drawing showing the internal structure of an example of an apparatus for producing an electronic component of the present invention.
Figure 6:
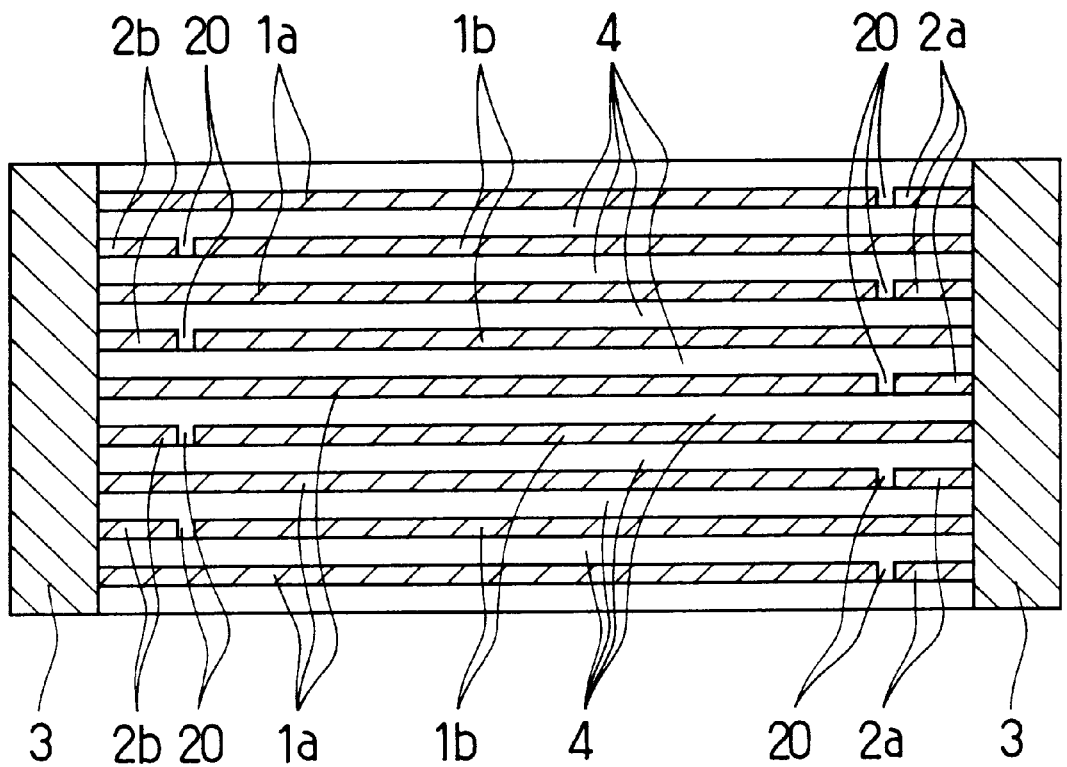
FIG. 6 is a schematic view showing a cross-sectional structure of an example of an electronic component with a laminated structure.

In the following examples, electronic components were formed by multilayer-lamination of conductive thin films (metal thin films) and dielectric thin films with an apparatus as schematically shown in FIG. 5.

In FIG. 5, a metal thin film formation source 8, a dielectric thin film formation source 9, a curing apparatus 10 and a metal thin film patterning apparatus 11 are arranged around a laminated film support cylinder 7. The cylinder 7 rotates at a constant speed in a rotation direction 12. Therefore, a thin film laminate including metal thin films and dielectric thin films laminated alternately is formed on the outer surface of the cylinder 7. The number of laminations is in accordance with the number of the rotations of the cylinder 7. They are housed in a vacuum chamber 5, where a vacuum or a low pressure is maintained by an evacuation system 6 including a vacuum pump or the like.

As the metal thin film formation source 8, a resistance heating evaporation source, an induction heating evaporation source, an electron beam evaporation source, a sputtering evaporation source, a cluster evaporation source or other apparatuses used to form a thin film, or a combination thereof can be used depending on the metal thin film to be formed. The formed metal thin film serves as the conductive thin film of the present invention.

Furthermore, as the dielectric thin film formation source 9, apparatuses for heating and vaporizing a resin based material by a heater, vaporizing or atomizing a resin based material by ultrasonic waves or an atomizer, sputtering a ceramic based material, or sputtering or depositing an oxide or the like can be used depending on the dielectric thin film to be formed.

The curing apparatus 10 cures the dielectric thin film formed by the dielectric thin film formation source 9 to a predetermined hardness. As the curing apparatus 10, ultraviolet ray curing, electron beam curing, heat curing or a combination thereof can be used, when a resin thin film is formed as the dielectric.

A tape or oil can be used for patterning a metal thin film by the metal thin film patterning apparatus 11. More specifically, when a metal thin film is formed where a narrow tape is placed, the metal thin film formed on the tape is removed with the tape so that the metal thin film is patterned. Alternatively, when oil is applied in an small amount in accordance with the pattern before the formation of the metal thin film, the metal thin film is not formed on the oil pattern. Thus, the metal thin film is patterned. In this manner, the insulating region of the present invention is formed. Furthermore, the insulating region can be formed in different positions by changing the patterning position, every time the cylinder 7 rotates once.

After the thin film laminate is formed on the outer surface of the cylinder 7 by laminating the patterned metal thin film and the dielectric thin film alternately, the laminate is cut and the auxiliary electrodes are formed by thermal spraying or the like, if necessary. Thus, an electronic component can be produced.

FIG. 5 shows an illustrative method for forming a multilayered laminate of the metal thin films and the dielectric thin films. Other than the method of FIG. 5, a multilayered laminate can be formed by superimposing a large number of laminates, each of which includes metal thin films and dielectric thin films formed on a film. In other words, the scope of the present invention is not limited to the method of FIG. 5.

EXAMPLE 1

Figure 1:
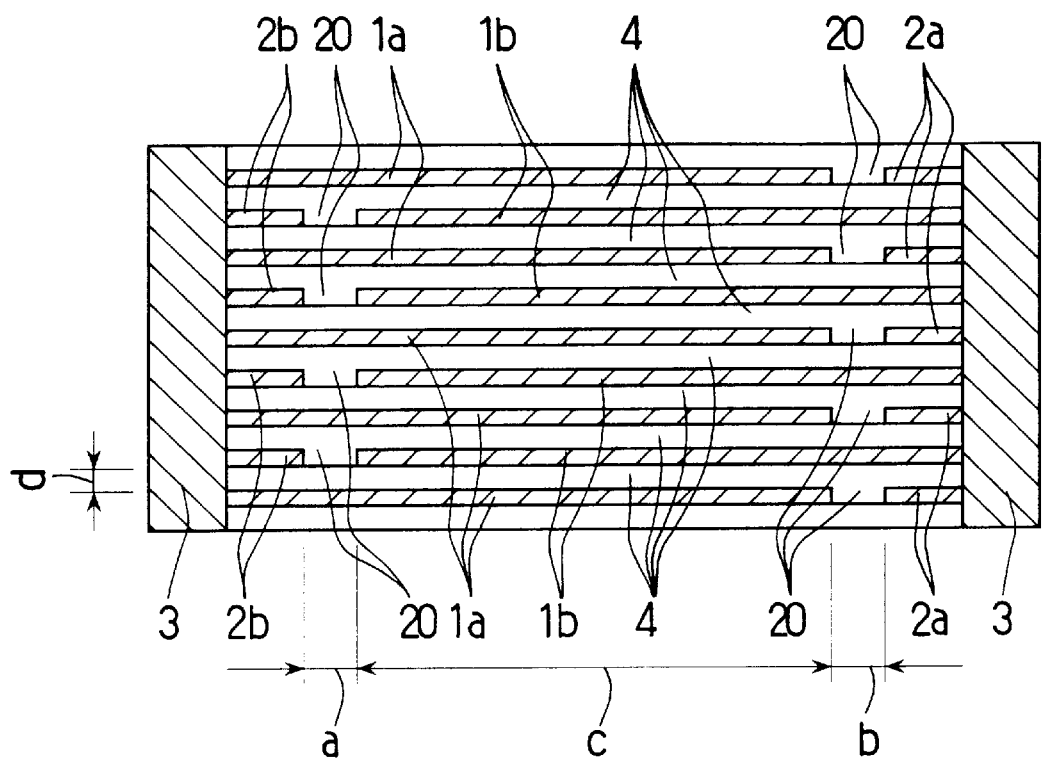
FIG. 1 is a schematic view showing a cross-sectional structure of an electronic component in Example 1 of the present invention.

A capacitor was obtained by forming an evaporated thin film of aluminum as a conductive thin film and an acrylate resin thin film obtained by heating to vaporize an acrylate resin material by a heater as a dielectric thin film. The films were formed by a combination of ultraviolet ray curing and oil patterning. FIG. 1 shows a schematic cross-sectional view of the obtained capacitor.

As shown in FIG. 1, a dielectric thin film 4 is formed on a first conductive thin film 1*a*, and a second thin film 1*b* is formed on the dielectric thin film 4. Furthermore, a dielectric thin film 4 is formed thereon. A third conductive thin film 2*a* having approximately the same electric potential as that of the second conductive thin film 1*b* is formed as a dummy electrode approximately in the same surface on which the first conductive thin film 1*a* is formed with an insulating region 20 therebetween, and a fourth conductive thin film 2*b* having an approximately the same electric potential as that of the first conductive thin film 1*a* is formed as a dummy electrode approximately in the same surface on which the second conductive thin film 1*b* is formed with the insulating region 20 therebetween. The layers described above constitute one laminate unit, and a plurality of laminates are laminated. Furthermore, auxiliary electrodes 3 are formed at both ends of the laminates of the conductive thin films and the dielectric thin films.

Figure 2:
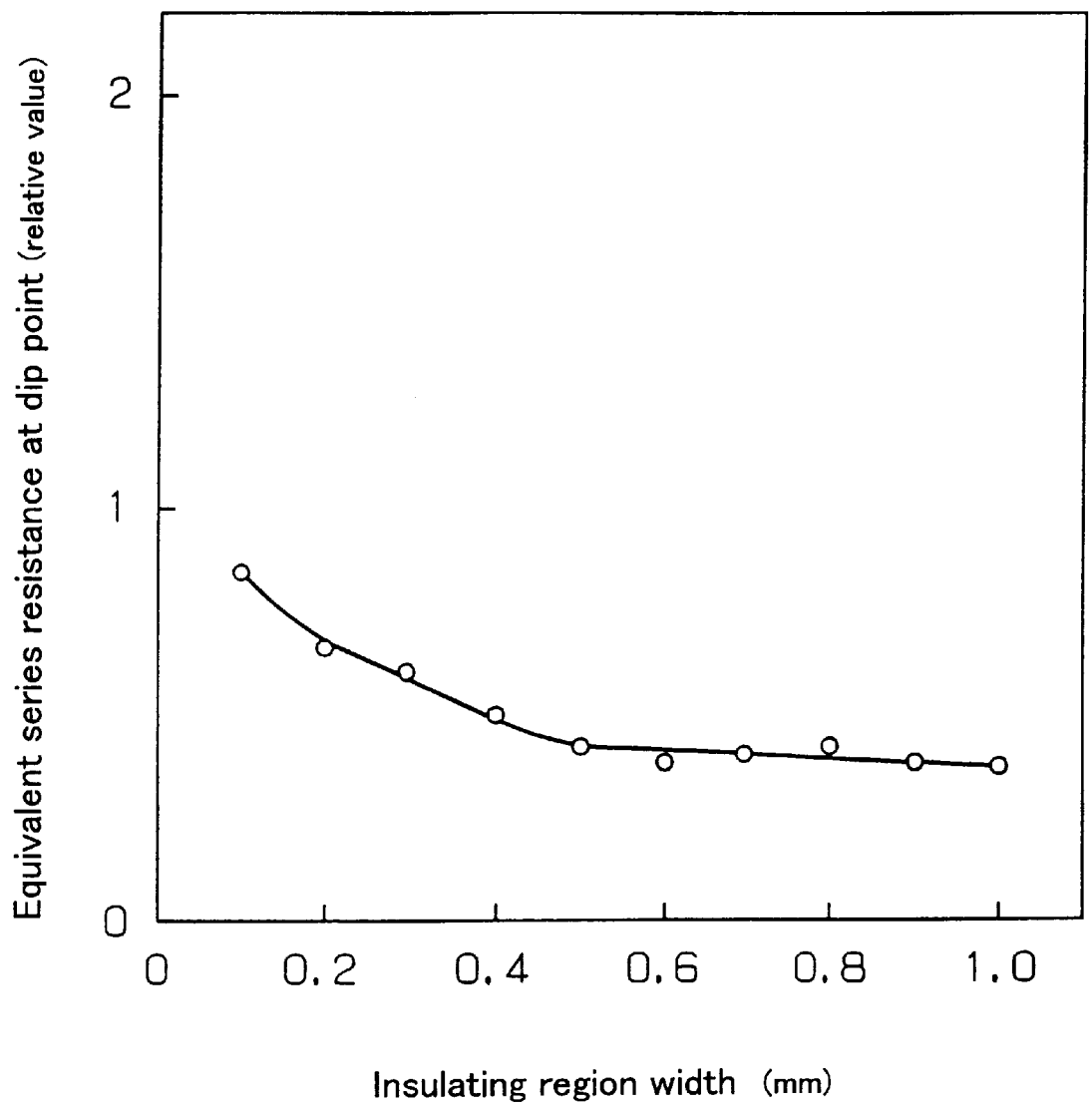
FIG. 2 is a graph showing an example of the relationship between the insulating region width and the equivalent series resistance of a capacitor of Example 1.

The thickness of the aluminum thin film was 50nm, and the thickness d of the dielectric thin film (resin thin film) was 1 $\mu$m. As the resin material, 1.9 nonanediol acrylate including 5 wt % of a photopolymerization initiator was used. About 1000 aluminum layers and about 1000 resin layers were laminated alternately and repeatedly, and the widths a and b of the insulating regions 20 formed by patterning were changed in a range of 0.1 to 1.0 mm by changing the amount of oil. The gap c between the insulating regions in the film surface direction was 2.5 mm. The frequency characteristics of the equivalent series resistance of the produced capacitor were measured, and the values at the dip point were obtained. FIG. 2 shows the results.

FIG. 2 indicates that the resistance at the dip point is smaller when the width of the insulating region is 0.5 mm or more, compared with when the width of the insulating region is smaller.

EXAMPLE 2

A capacitor shown in section in FIG. 1 was obtained by forming an evaporated thin film of aluminum as a conductive thin film and an acrylate resin thin film obtained by heating to vaporize an acrylate resin material by a heater as a dielectric thin film. The films were formed by a combination of ultraviolet ray curing and oil patterning.

Figure 3:
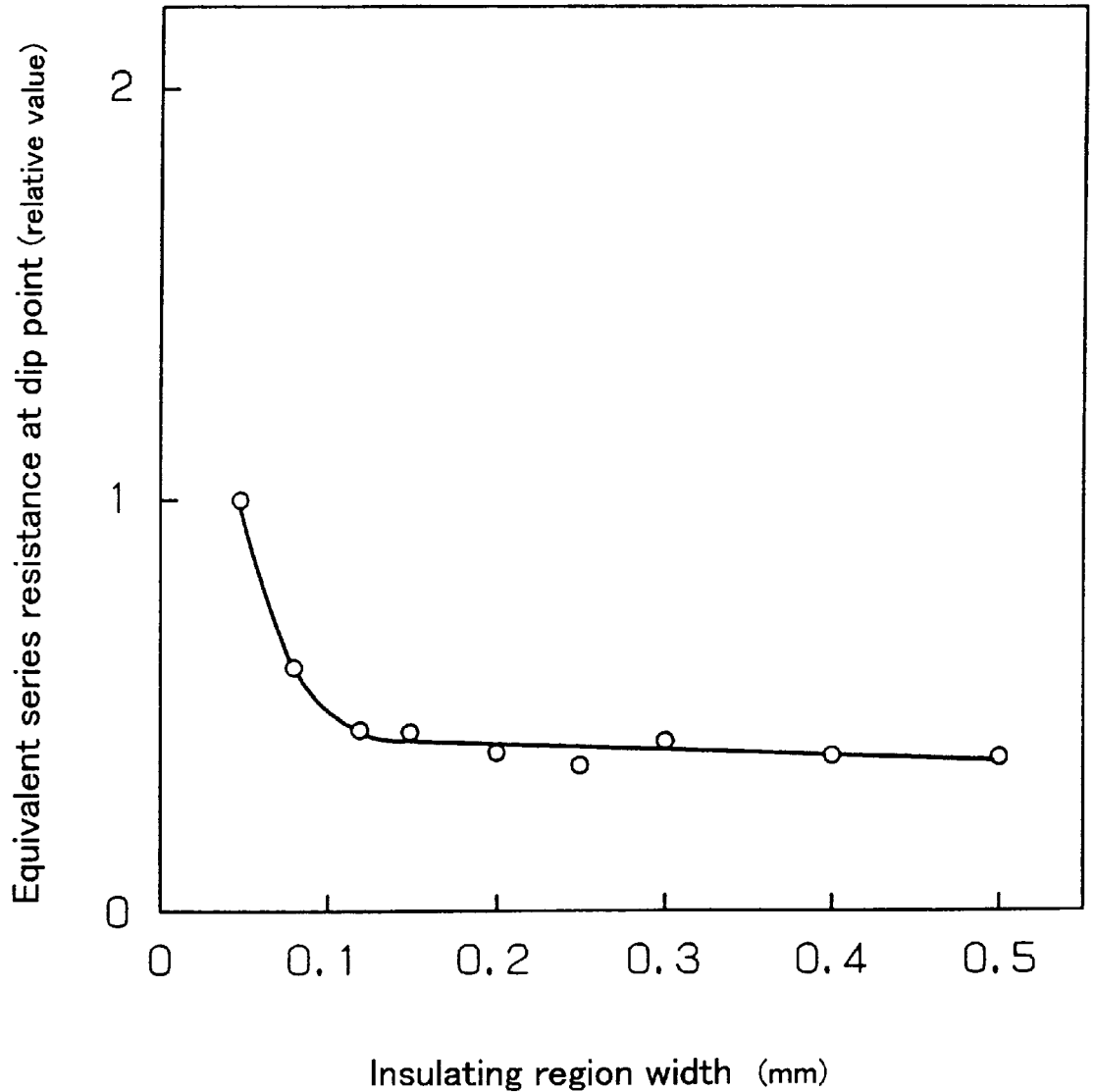
FIG. 3 is a graph showing an example of the relationship between the insulating region width and the equivalent series resistance of a capacitor of Example 2.

The thickness of the aluminum thin film was 40 nm, and the thickness d of the dielectric thin film (resin thin film) was 0.3 $\mu$m. As the resin material, dimethinol tricyclodecane diacrylate including 1 wt % of a photopolymerization initiator was used. About 4000 aluminum layers and about 4000 resin layers were laminated alternately and repeatedly, and the widths a and b of the insulating regions 20 formed by patterning were changed in a range of 0.05 to 0.5 mm by changing the amount of oil. The gap c between the insulating regions in the film surface direction was 1.4 mm. The frequency characteristics of the equivalent series resistance of the produced capacitor were measured, and the values at the dip point were obtained. FIG. 3 shows the results.

FIG. 3 indicates that the resistance at the dip point is smaller when the width of the insulating region is 0.15 mm or more, compared with when the width of the insulating region is smaller.

EXAMPLE 3

A capacitor shown in section in FIG. 1 was obtained by forming an evaporated thin film of aluminum as a conductive thin film and an acrylate resin thin film by heating to vaporize an acrylate resin material by a heater as a dielectric thin film. The films were formed by a combination of electron beam curing and oil patterning.

Figure 4:
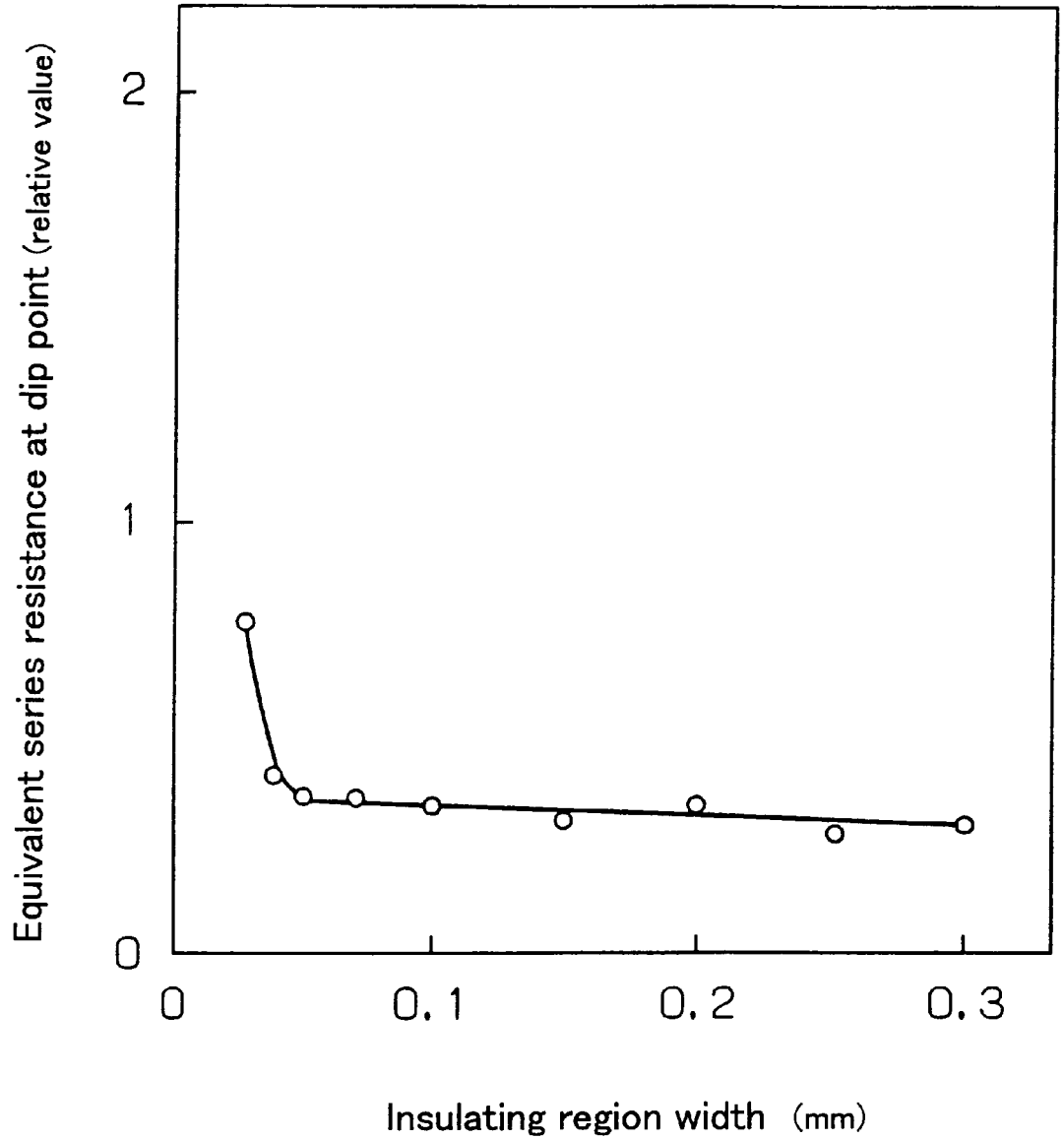
FIG. 4 is a graph showing an example of the relationship between the insulating region width and the equivalent series resistance of a capacitor of Example 3.

The thickness of the aluminum thin film was 30 nm, and the thickness d of the dielectric thin film (resin thin film) was 0.08 μm. As the resin material, a mixture of 1.9 nonanediol acrylate and dimethinol tricyclodecane diacrylate in a ratio of 1:1 was used. About 10000 aluminum layers and about 10000 resin layers were laminated alternately and repeatedly, and the widths a and b of the insulating regions 20 formed by patterning were changed in a range of 0.03 to 0.3 mm by changing the amount of oil. The gap c between the insulating regions in the film surface direction was 1.4 mm. The frequency characteristics of the equivalent series resistance of the produced capacitor were measured, and the values at the dip point were obtained. FIG. 4 shows the results.

FIG. 4 indicates that the resistance at the dip point is smaller when the width of the insulating region is 0.04 mm or more, compared with when the width of the insulating region is smaller.

In FIGS. 2 to 4, "the equivalent series resistance" in the vertical axes were obtained in the following manner. The frequency characteristics of the impedance of each capacitor for measurement were measured, and the real number of the impedance at the drop point (dip point), i.e., the equivalent series resistance, was obtained. Next, the equivalent series resistance at the dip point of the capacitor having both widths a and b of the insulating regions 20 of 0.05 mm in Example 2 is taken as the reference and represented as 1. In these graphs, the relative values with respect to the reference are shown for the equivalent series resistances of other capacitors.

The reason why the equivalent series resistance at the dip point is varied depending on the width of the insulating region in Examples 1 to 3 is as follows.

When the width of the insulating region is small, the distance from the dummy electrode is small, so that the influence of the electric field of the dummy electrode cannot be ignored. This influence is more significant as the proportion of the influencing portion of the dummy electrode to the entire component increases due to the miniaturization of the component. Furthermore, the degree of the influence is varied with the thickness of the dielectric thin film. The experimental results show that in order to minimize the resistance at the dip point by eliminating the influence of the electric field distortion, it is effective to ensure that the width of the insulating region is not less than 500 times the thickness of the dielectric thin film.

In the examples, the acrylate based resin materials are used as the dielectric. However, as described above, other resin materials such as an epoxy based materials, or material other than the resin materials such as ceramic or metal oxide based materials can be used.

For example, the advantages of the present invention were confirmed when a metal oxide such as a titanium oxide having a thickness of 50 nm to 300 nm formed by electronic beam evaporation in an oxygen atmosphere was used as the dielectric.

In the examples, aluminum was used as the conductive thin film (metal thin film). However, copper, silver, nickel, zinc or other metals or an alloy containing these metals can be used. The conductive thin film is not necessarily one type, but for example, a mixture of Al layers and Cu layers can be used so that the characteristics can be complemented. Thus, the performance may become higher in some use conditions.

In Examples 1, 2 and 3, the can is used as the support. However, the present invention is not limited to this support, but supports other than the cylindrical support such as a flat or curved support can be used. In addition, an electronic component can be formed on a metal, an insulator, glass or a semiconductor by using the present invention.

In the examples, a capacitor is taken as an example of an electronic component. However, it is appreciated easily that also in other electronic components such as a chip coil or a noise filter provided with a dummy electrode, the influence of the electric field distortion can be ignored by satisfying the relationship between the width of the insulating region and the thickness of the dielectric thin film described in the present invention so that high performance can be achieved. The present invention can be applied widely to any electronic components.

The examples described above are only intended to embody the technological content of the present invention and not construed as limiting the present invention to the examples. The scope of the invention is indicated by the appended claims rather than by the foregoing description, and all changes which come within the meaning and range of equivalency of the claims are intended to be embraced therein.

Industrial Applicability

As described above, the electronic component of the present invention having a dummy electrode can have a small equivalent series resistance at the drop point (dip point) in the frequency characteristics of the impedance. Therefore, the electronic component of the present invention can be utilized in a wide range as a high performance electronic component having excellent frequency characteristics. For example, in an application as a capacitor, since the advantage described above cannot be lost even if the dielectric thin film is miniaturized, a compact capacitor having large capacity can be obtained. In particular, the adhesive strength of the auxiliary electrode is high because of the presence of the dummy electrodes, so that the present invention utilized as a chip capacitor provides a remarkable advantage. In addition, in other electronic components such as a chip coil, noise filter or the like where the dummy electrode is formed, the influence of the electric field distortion of the dummy electrode can be ignored. Therefore, high performance can be achieved. Thus, the present invention can be applicable widely to any electronic components.

What is claimed is:

1. An electronic component comprising a first conductive thin film, a dielectric thin film formed on the first conductive thin film, and a second conductive thin film formed on the dielectric thin film, wherein a third conductive thin film having an electric potential approximately equal to that of the second conductive thin film is formed approximately in a same surface on which the first conductive thin film is formed, an insulating region being interposed between the first conductive thin film and the third conductive thin film, and a fourth conductive thin film having an electric potential approximately equal to that of the first conductive thin film is formed approximately in the same surface on which the second conductive thin film is formed, an insulating region being interposed between the second conductive thin film and the fourth conductive thin film, and a gap between the first conductive thin film and the third conductive thin film and a gap between the second conductive thin film and the fourth conductive thin film are not less than 500 times a thickness of the dielectric thin film.

2. The electronic component according to claim 1, wherein the dielectric thin film is formed of a resin thin film.

3. The electronic component according to claim 2, wherein the resin thin film comprises at least acrylate as a main component.

4. The electronic component according to claim 1, wherein the conductive thin films are formed of a metal thin film.

5. The electronic component according to claim 1, having an alternate and repeated laminated structure, wherein the laminated structure comprises at least two layers of the conductive thin films and at least two layers of the dielectric thin films, and the conductive thin films and the dielectric thin films are laminated alternately.

6. The electronic component according to claim 1, wherein the first conductive thin film and the fourth conductive thin film are connected by an auxiliary electrode, and the second conductive thin film and the third conductive thin film are connected by an auxiliary electrode.

7. The electronic component according to claim 1, wherein a part of or an entire laminate of the conductive thin films and the dielectric thin films functions as a capacitor.

8. The electronic component according to claim 1, wherein a gap between the insulating regions in a film surface direction is not more than 17500 times a thickness of the dielectric thin film.

* * * * *